United States Patent [19]

Satomi et al.

[11] Patent Number: 4,901,179

[45] Date of Patent: Feb. 13, 1990

[54] MAGNETIC HEAD HAVING A LAMINATED STRUCTURE

[75] Inventors: Mitsuo Satomi, Katano; Ken Hirota, Toyonaka; Osamu Inoue, Kobe, all of Japan

[73] Assignee: Matsushita Electric Industrial Co., Ltd., Kadoma, Japan

[21] Appl. No.: 161,408

[22] Filed: Feb. 23, 1988

Related U.S. Application Data

[63] Continuation of Ser. No. 829,070, Feb. 13, 1986, abandoned.

[30] Foreign Application Priority Data

Feb. 15, 1985 [JP] Japan .................................. 60-28639
Oct. 11, 1985 [JP] Japan ................................. 60-227111

[51] Int. Cl.$^4$ ....................... G11B 5/147; G11B 5/235
[52] U.S. Cl. ..................................... 360/126; 360/120
[58] Field of Search ............... 360/119, 125, 126, 127; 428/900, 928

[56] References Cited

U.S. PATENT DOCUMENTS

| | | | |
|---|---|---|---|
| 3,683,126 | 8/1972 | Krause | 360/126 |
| 4,368,496 | 1/1983 | Kato et al. | |
| 4,392,167 | 7/1983 | Joorman | 360/120 |
| 4,411,716 | 10/1983 | Shiiki et al. | 360/125 |
| 4,488,195 | 12/1984 | Yanagiuchi et al. | 360/125 |
| 4,608,293 | 8/1986 | Wada et al. | 360/120 |
| 4,608,297 | 8/1986 | Shimada et al. | 360/125 |
| 4,681,813 | 7/1987 | Yamada et al. | 360/120 |
| 4,785,526 | 11/1988 | Koyama | 360/120 |

FOREIGN PATENT DOCUMENTS

0159819 12/1981 Japan ................................... 360/126
0187910 9/1985 Japan ................................... 360/120

OTHER PUBLICATIONS

Patent Abstracts of Japan, vol. 7, No. 142 (P-205)[1287], 22nd Jun. 1983; and JP-A-58 56 220 (Alps Denki K.K.) 02-04-1983.
Patent Abstracts of Japan, vol. 7, No. 127 (P-201)[1272], 3rd Jun. 1983; and JP-A-58 45 617 (Sony K.K.) 16-03-1983.
Patent Abstracts of Japan, vol. 7, No. 262 (P-238)[1407], 22nd Nov. 1983; and JP-A-58 143 427 (Matsushita Denki Sangyo K.K.) 26-08-1983.
Patent Abstracts of Japan, vol. 8, No. 109 (P-275) [1546], 22nd May 1984; and JP-A-59 209 (TDK K.k.) 31-01-1984.
Patent Abstracts of Japan, vol. 7, No. 256 (P-236[1401], 15th Nov. 1983; and JP-A-58 139 322 (Matsushita Denki Sangyo K.K.) 18-08-1983.
Patent Abstracts of Japan, vol. 9, No. 195 (P-379)[1918], 13th Aug. 1985; and JP-A-60 61 911 (Hitachi Seisakusho K.K.) 09-04-1985.

*Primary Examiner*—Stuart N. Hecker
*Assistant Examiner*—David J. Severin
*Attorney, Agent, or Firm*—Cushman, Darby & Cushman

[57] ABSTRACT

Tape contact surface of a magnetic head is made of magnetic substance of multi-layered structure; interface insulation material for said multi layered structure and/or gap spacer material are made of oxides, complex oxides, nitrides and carbides of transition metal elements, IIa group elements of the periodic table and Zn; and accumulation of magnetic material from magnetic tape is prevented and output of magnetic head is stabilized.

5 Claims, 2 Drawing Sheets

MAGNETIC HEAD HAVING A LAMINATED STRUCTURE

This is a continuation of application Ser. No. 829,070 filed Feb. 13, 1986, now abandoned.

FIELD OF THE INVENTION AND RELATED ART STATEMENT

1. Field of Invention

The present invention relates to a magnetic head, and particularly pertains to a magnetic head suitable for a video-tape recorder.

2. Description of the Related Art

Hitherto, ferrite is widely used as core material of magnetic head, because it has high wear resistance. But, since its saturation magnetization, Bs, is lower than alloy-material by 30%–50%, when ferrite is used for high density recording media which has been put to practical use lately, magnetic saturation of the head core becomes a problem. From a view point of the above, a magnetic head comprising permalloy or sendust has been put into practice for high density recording media.

On the other hand, amorphous alloy draws attention as splended material in both of wear resistance and magnetic characteristic.

In case that those alloys are used as core material of a magnetic head, a laminated structure is generally employed in order to avoid eddy current loss in the high frequency range, since specific resistance of the core material per se is low (70–120 $\mu\phi\cdot$cm).

In an audio head, track width is comparatively large and is several hundred $\mu$m in thickness, and further, its frequency range is lower, therefore the thickness of a core is relatively large and is 200–300 $\mu$m in thickness; in order to form a lamination, gap formation, adhesive such as epoxy resin or the like, is used.

In case of magnetic heads for VTRs, computer memory devices and various data recorders, track width is very small, for instance several scores $\mu$m, and further, since gap length is very short, for instance, less than 0.3 $\mu$m, it is difficult to keep the gap length in high precision by using an adhesive.

Furthermore, in case that track width is small and using frequency in a range of several MHz–10 MHz and is comparatively high; desirable thickness of a core is less than 10 $\mu$m.

However, it is difficult to prepare a core having such a small thickness in the present technology; and furthermore even in a structure comprising ribbon-amorphous or ribbon-sendust, it is difficult to attain a uniform thickness of core, when the thickness of the core is less than 20 $\mu$m.

From a viewpoint of the above, a method wherein thin layer of amorphous alloy or sendust alloy as magnetic material is prepared by adopting sputtering method or vapor deposition method.

By using these methods, a core having thickness of less than 10 $\mu$m is obtained easily, and since it is possible to laminate magnetic material and interface insulation material alternately and adhesion strength between each material is large, it is possible to retain the gap with the above-mentioned high precision.

In such prior art, it is well known that $SiO_2$ is used as interface insulation material. And further, as gap spacer material, employment of the $SiO_2$ is well known.

Using such a coventional magnetic head comprising lamination magnetic core made of metal magnetic material and $SiO_2$ as interface insulating material, running tests for conventional metal particulate tape were made in various environment. As a result, it was found that particularly in low humidity environment, head output was greatly lowered. Observing a tape contact surface of the head, output of which was lowered, selective accumlation was found around the section of the $SiO_2$ as interface insulation material. As a result of measurement by surface analyzer, thickness of the accumlation was 500–600 A. The cumulation was analyzed by Auger analysis method, and it was found that the component of accumulation was magnetic material component in the metal tape, and further, for thickness of the accumulation both data based on the surface analyzer and the Auger analysis method agreed with each other. And further, little accumulation was observed on the gap.

Collectively considering the above, it is found that when metal particulate tape runs in low humidity environment, the magnetic material of metal tape selectively accumulates around $SiO_2$ used as interface insulation material in magnetic head comprising thin sheets of metal magnetic material. Because of this accumulation, spacing takes place between the magnetic head and tape, and head output lowers on account of spacing loss.

On the other hand, as number of laminations increases steadily, a trend of decrease of permeability ($\mu'$) is observed, though thickness of magnetic material is kept the same. This is because the magnetostriction constant ($\lambda s$) has not become zero perfectly, and besides the thermal expansion coefficient ($\alpha$) of magnetic material is more than ten times as large as that of $SiO_2$.

OBJECT AND SUMMARY OF THE INVENTION

The present invention is intended to solve the above-mentioned problem of the prior art, and the purpose of the present invention is to obtain a magnetic head on which magnetic material component of tape does not accumulate, thereby to provide a stable head output.

The magnetic head of the present invention is characterized in that its tape contact surface comprises a section of multi layered structure of magnetic substance, and at least one interface insulation material between the layers of said magnetic substance of multi layered structure and comprising the gap spacer material comprises one member selected from the group comprising oxides, complex oxides, nitrides and carbides of transition metal elements, IIa group elements of the periodic table and Zn.

DESCRIPTION OF THE PREFERRED EMBODIMENT

Figure 1:
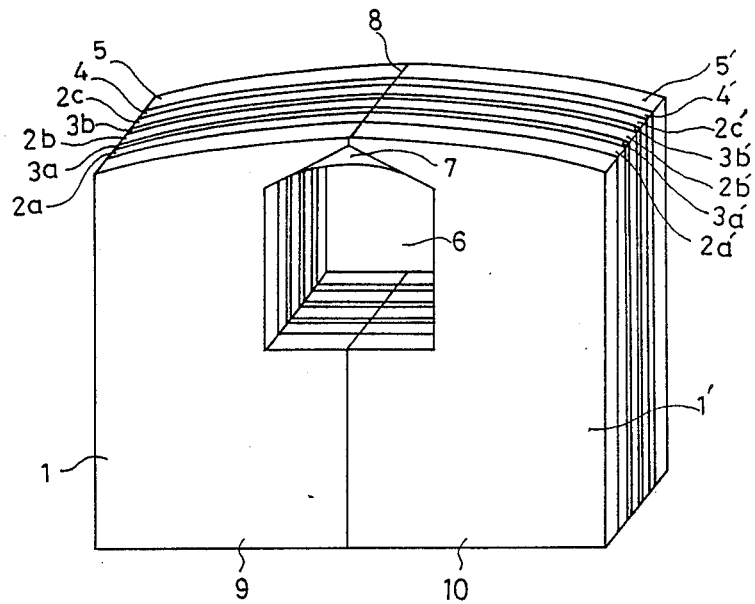
FIG. 1 is a perspective view showing a magnetic head as an embodiment of the present invention.
Figure 2:
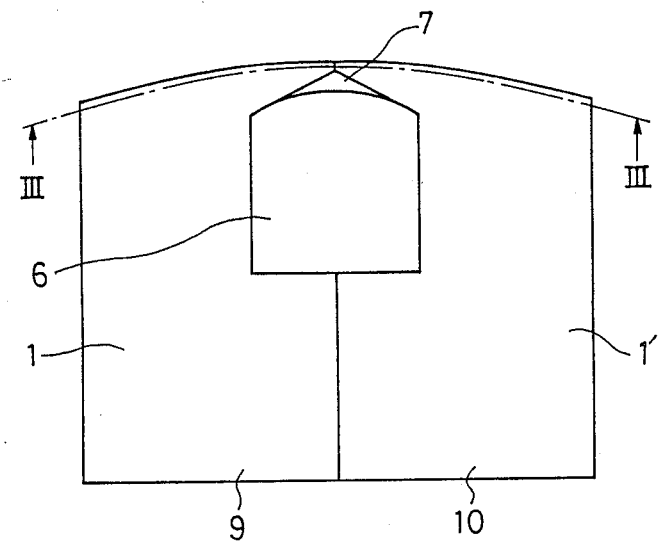
FIG. 2 is a plan view showing a magnetic head as an embodiment of the present invention.
Figure 3:
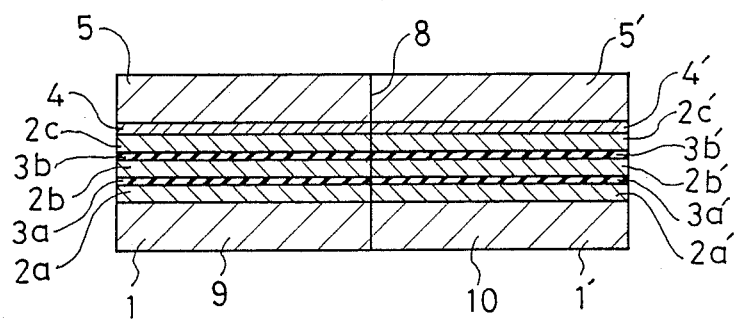
FIG. 3 is a sectional view taken on line III—III of FIG. 2.

In the following, one embodiment of the present invention is elucidated with reference to FIGS. 1 and 2.

Substrate material of a non-magnetic metal, such as brass, is subject to a mirror-grinding and washed sufficiently, thus to obtain a substrate 1. The substrate 1 is put into a known vacuum chamber depressed to $3\times10^{-7}$ Torr. After Ar gas is supplied to the vacuum chamber to a pressure of $2\times10^{-2}$ Torr, amorphous alloy layer 2a on the substrate 1 is made by sputtering wherein component of target is 81 atomic % Co, 13 atomic % Nb and 6 atomic % Zr.

Next, taking interface insulation material as target of sputtering, a layer 3a of the interface insulation material having thickness of 1000 Å is disposed on the amorphous alloy layer 2a by sputtering at Ar pressure of $4\times10^{-2}$ Torr.

Thereafter, in a similar way to the above, amorphous alloy layers 2b, 2c and interface insulation material layer 3b are sputtered alternately to form 2b, 3b and 2c, in this order on the amorphous alloy layer 2a, and thus triple-layered structure block is obtained.

On the other hand, substrate 5, material of which is the same as that of substrate 1 is adhered to amorphous alloy layer 2c with bonding glass layer 4 therebetween, thus a laminated core is obtained.

Next, a winding aperture 6 is engraved on the gap forming face of the laminated core. And, after carrying out a mirror-grinding by using diamond paste on the gap forming surface, the gap spacer material is sputtered on that surface to a predetermined thickness, thus a laminated core block 9 to form one side of a magnetic head is completed.

Another laminated core block 10 having the same components 1' to 5' as the block 9 is made in accordance with the same process as the above-mentioned.

And then the gap forming faces of the blocks 9, 10 are abutted to each other with bonding glass 7 therebetween, to form the gap 8. After being worked to predetermined shape, a magnetic head is completed.

This magnetic head was attached to a video tape recorder (relative speed of tape was 3.8 m/sec), and, tape running tests were carried out in various environments, using general metal particulate tape. As a result of the running tests, in the conventional magnetic head wherein $SiO_2$ is used as interface insulation material or gap spacer material, considerable drop of head output was observed. But, in the magnetic head of the present invention, stable head output was obtained in all environments of the tests.

The outputs of the magnetic head of the present invention at a temperature of 23° C. and a relative humidity of 10% obtained by the tests are shown in Table 1 with the output of a conventional magnetic head as a comparison sample. In Table 1, the head outputs are relative values taking head output at a temperature of 23° C. and relative humidity of 70% as 0 (dB).

TABLE 2

| Interface insulation material | Thermal expansion coefficient $\alpha(\times 10^{-7}/°C.)$ | Sendust alloy layer | | | Magnetic permeability $\mu'$ (100 KHz, 1mOe) |
|---|---|---|---|---|---|
| | | Thickness of one layer (μm) | Lamination number | Total thickness (μm) | |
| $SiO_2$ (Conventional material) | 4 | 10 | 3 | 30.3 | 2000 |
| | | 3 | 10 | 30.9 | 800 |
| $ZnFe_2O_4$ | 85 | 10 | 3 | 30.3 | 2500 |
| | | 3 | 10 | 30.9 | 2300 |
| $Mg_2TiO_4$ | 90 | 10 | 3 | 30.3 | 2700 |
| | | 3 | 10 | 30.9 | 2400 |
| $NiMnO_2$ | 115 | 10 | 3 | 30.3 | 3000 |
| | | 3 | 10 | 30.9 | 2900 |
| $SrTiO_3$ | 100 | 10 | 3 | 30.3 | 2800 |
| | | 3 | 10 | 30.9 | 2700 |
| $\alpha\text{-}Fe_2O_3$ | 105 | 10 | 3 | 30.3 | 2900 |
| | | 3 | 10 | 30.9 | 2800 |
| TiN | 94 | 10 | 3 | 30.3 | 2700 |
| | | 3 | 10 | 30.9 | 2500 |
| TiC | 76 | 10 | 3 | 30.3 | 2500 |
| | | 3 | 10 | 30.9 | 2200 |
| WC | 73 | 10 | 3 | 30.3 | 2400 |
| | | 3 | 10 | 30.9 | 2150 |
| ZrC | 67 | 10 | 3 | 30.3 | 2400 |
| | | 3 | 10 | 30.9 | 2050 |
| TaC | 82 | 10 | 3 | 30.3 | 2600 |
| | | 3 | 10 | 30.9 | 2300 |

Next, non magnetic stainless steel as substrate is put into a vacuum chamber depressured to $5\times10^{-7}$ Torr; after Ar gas is provided in the vacuum chamber to a pressure of $1.5\times10^{-3}$ Torr, sputtering is carried out to the substrate taking a sendust alloy (Fe 84.5 wt %, Si 9.7 wt % Al 5.8 wt %) as target of the sputtering. And then, taking interface insulation material as target, sputtering is carried out to the sendust layer at Ar gas pressure of $4\times10^{-2}$ Torr, thus interface insulation material of about 1000 Å in thickness is formed.

Hereinafter, in a way similar to the above the sendust alloy layer and the interface insulation material layer are laminated alternately, thus obtaining multi layered sendust.

Table 2 shows magnetic permeability of the resultant layers at a frequency of 100 KHz with a magnetic field of 1 mOe. The magnetic permeabilities in Table 2 are the values wherein only the thickness of the magnetic material is taken into account and the interface insulation material is neglected because of their small thickness.

TABLE 1

| Interface insulation material (Target material) | Gap spacer material (Target material) | 23° C. 10% Relative humidity head output (dB) |
|---|---|---|
| $SiO_2$ (Conventional material) | $SiO_2$ (Conventional material) | −4 |
| $\alpha\text{-}Fe_2O_3$ | $SiO_2$ (Conventional material) | −0.5 |
| $MgNiO_2$ | $SiO_2$ (Conventional material) | −0.3 |
| $MgMnO_2$ | $SiO_2$ (Conventional material) | −0.5 |

TABLE 1-continued

| Interface insulation material (Target material) | Gap spacer material (Target material) | 23° C. 10% Relative humidity head output (dB) |
| --- | --- | --- |
| Mg$_2$TiO$_4$ | SiO$_2$ (Conventional material) | −0.2 |
| SrTiO$_2$ | SiO$_2$ (Conventional material) | −0.5 |
| NiMnO$_2$ | SiO$_2$ (Conventional material) | −0.5 |
| ZnFe$_2$O$_4$ | SiO$_2$ (Conventional material) | −0.2 |
| α-Fe$_2$O$_3$ | α-Fe$_2$O$_3$ | 0 |
| MgNiO$_2$ | SrTiO$_2$ | 0 |
| NiMnO$_2$ | ZnFe$_2$O$_4$ | 0 |
| ZnFe$_2$O$_4$ | ZnFe$_2$O$_4$ | 0 |

In the above-mentioned embodiment, a magnetic head having a sandwich structure wherein a head core is put between substrates is used, but, similar effects are realized in a magnetic head wherein the whole area of the tape contact surface consists of magnetic substance of multi layered structure.

And further, Tables 1 and 2 show limited varieties of components of oxides, complex oxides, nitrides and carbides of transition metal elements, IIa group elements of the periodic table and Zn. But it is not necessary that the component is limited to those shown in Tables 1 and 2. So far as the component is in a practically permissible range, that is, the component is a substantial part of the material, the above-mentioned effect is realized, even if the said materials contain some impurities or there is some difference between the target component and the material component.

In the above-mentioned embodiment, magnetic material is amorphous alloy of Co-Nb-Zr system, but other alloys, such as Co-Fe-Si-B system and Ni-Si-B system show similar effects. And further the magnetic material is not restricted to the sputtering material, but ribbon amorphous made by melt quenching method or thin layer made by vapor deposition method or the like can be used as the magnetic material.

Furthermore, component of the sendust alloy is not restricted, and is effective in Fe-Si-Al alloy system. Therefore, permalloy (Fe-Ni alloy) as alloy magnetic material can be expected to have a similar effect, because magnetic permeability greatly effects magnetostriction.

As mentioned above, in the present invention, since, material comprising oxides, complex oxides, nitrides or carbides of the transition metal elements, IIa group elements of the periodic table and Zn are used as interface insulation material or gap spacer material for a magnetic head made of magnetic substance having a multi layered structure, the magnetic material component in a tape no longer on the magnetic head when running in various practical environments. Accordingly stable head output is obtained and a highly reliable magnetic head is realized.

By using the material of the present invention as interface insulation material, the thermal expansion coefficient of the interface insulation material is larger by another digit than that of conventional material, and the interface insulation material becomes more like metal magnetic material. Thereby, especially in case the number of lamination layers increases, or the thickness of one layer becomes thin, the influence of stress on the magnetic material becomes small, and accordingly deterioration of the magnetic head becomes small.

What is claimed is:

1. A magnetic head having a tape contact surface defined by a magnetic core and a gap, characterized in that said gap is filled with a gap space material and said magnetic core has a multilayered structure comprising alternate layers of a magnetic material and an interface insulation material, and
   at least one of said interface insulation material and said gap space material is substantially of one component selected from the group consisting of α-Fe$_2$O$_3$, MgO-NiO, MgO-MnO, MgO-TiO$_2$, SrO-TiO$_2$, NiO-MnO and ZnO-Fe$_2$O$_3$.

2. A magnetic head in accordance with claim 1, wherein;
   said magnetic material is amorphous magnetic alloy.

3. A magnetic head in accordance with claim 1, wherein;
   said magnetic material is mainly composed of Fe-Si-Al alloy.

4. A magnetic head in accordance with claim 1, wherein;
   said each layer of interface insulation material is a sputtered layer.

5. A magnetic head in accordance with claim 1, wherein;
   said magnetic material is a sputtered layer.

* * * * *